United States Patent [19]

Kassai

[11] 4,424,978
[45] Jan. 10, 1984

[54] VEHICLE FOR CHILDREN

[75] Inventor: Kenzou Kassai, Osaka, Japan

[73] Assignee: Kassai Kabushikikaisha, Osaka, Japan

[21] Appl. No.: 350,314

[22] Filed: Feb. 19, 1982

[51] Int. Cl.³ .............................................. A63G 19/18
[52] U.S. Cl. ...................................... 280/1.13; 46/97;
46/146; D21/78
[58] Field of Search ................... 280/1.13, 1.14, 1.174, 280/1.189, 1.201, 1.22, 1.1 R, 1.11 R, 87.02 R; D21/73, 74, 76, 78, 79; 296/177; 46/145, 146, 97, 201

[56] References Cited

U.S. PATENT DOCUMENTS

| | | | |
|---|---|---|---|
| 2,598,807 | 6/1952 | Lawson, Jr. et al. | 46/146 |
| 3,572,715 | 7/1969 | Ramirez | 46/146 |
| 4,264,080 | 4/1981 | Kassai | 280/1.13 |

*Primary Examiner*—Joseph F. Peters, Jr.
*Assistant Examiner*—Donn McGiehan
*Attorney, Agent, or Firm*—W. G. Fasse; D. H. Kane, Jr.

[57] ABSTRACT

A vehicle for children is constructed so that a child sits on it with the legs on either side and drives it with leg strokes kicking the ground. A hood-like portion (2) forming the front top of the body (1) of the vehicle is tiltably attached to the front of the body remainder (3). Thus, the tilting of the hood-like portion (2) enables the portion to assume a closed position and an opened position. The outer surface the hood-like portion (2) indicates an animal face, while a tongue element (23) serving as an instantaneously actuatable object which is urged by a spring (26) against the lower surface of the hood-like portion (2) when the latter is in its closed state is arranged in a lower space of the hood-like portion (2). As a result, when the hood-like portion (2) is opened, the tongue element (23) is put into instantaneous visual action.

6 Claims, 24 Drawing Figures

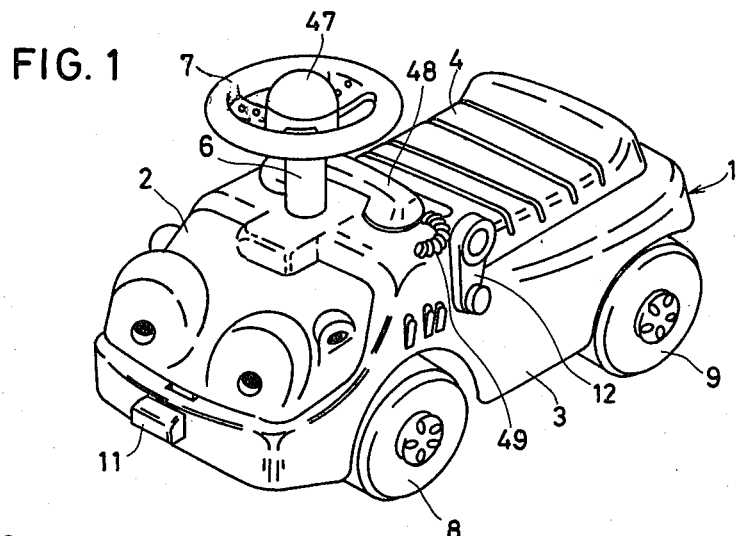
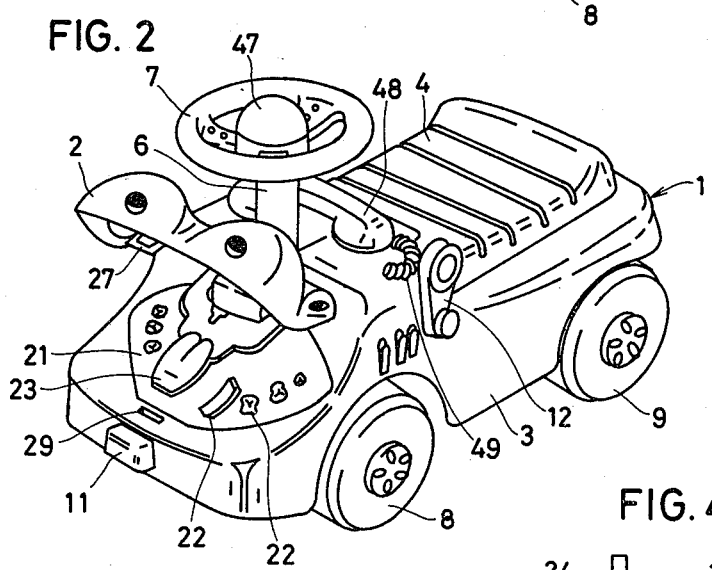
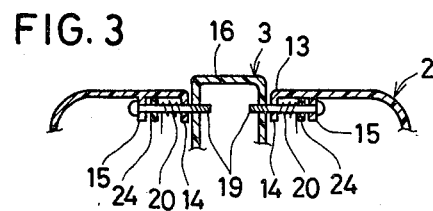
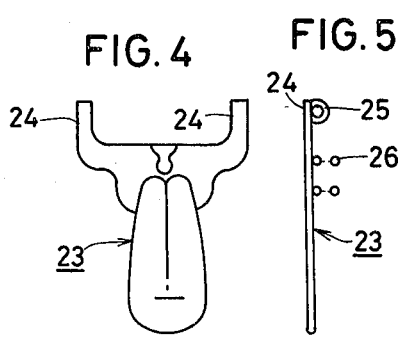

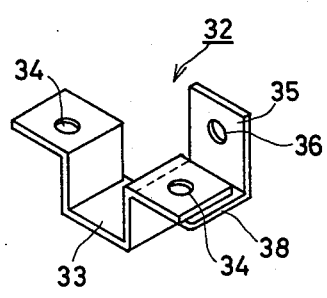
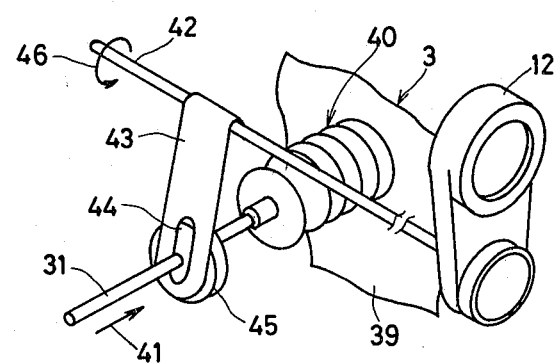
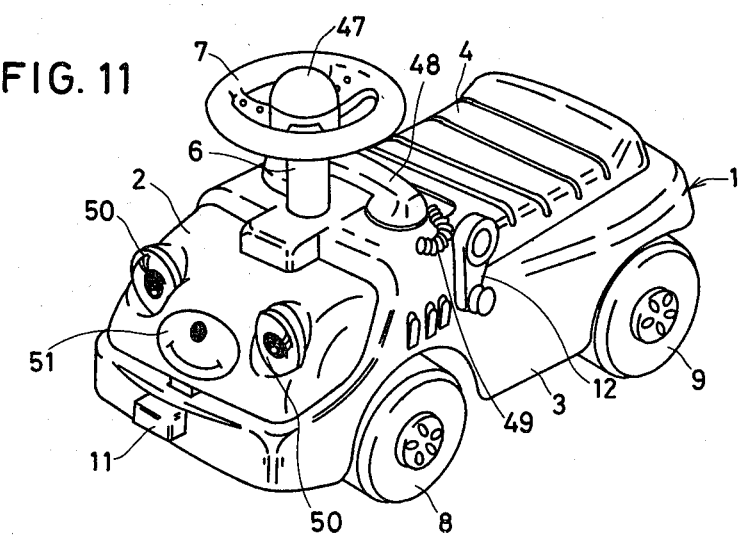
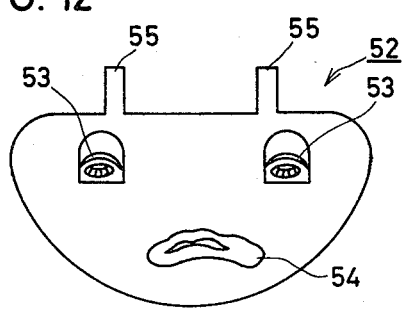
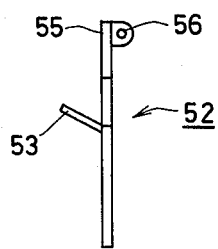

VEHICLE FOR CHILDREN

BACKGROUND OF THE INVENTION

1. Field of the Invention

This invention relates to a vehicle for children and particularly to a construction of vehicles for children improved to arouse the interest of children.

2. Description of the Prior Art

What is of particular interest to this invention is a vehicle for children constructed so that a child sits on it with the legs on either side and drives it with leg strokes kicking the ground. Such vehicles for children, simulating automobiles, motorcycles, airplanes, locomotives, streetcars, animals and other forms, have appeared on the market. Such a variety of static shapes should not go unheeded from the standpoint of arousing the interest of children.

Further, dynamic shapes, particularly where their actions are of unexpected nature, would perform the function of arousing the interest of children more intensely.

SUMMARY OF THE INVENTION

Accordingly, a principal object of the invention is to provide a vehicle for children provided with not only a static shape but also a dynamic function effective to arouse the interest of children.

In brief, the invention is directed to a vehicle for children wherein a hood-like front housing portion which forms the front upper surface of the vehicle body and which itself is supposed to arouse the interest of children because it exhibits dynamic changes, is arranged to be opened and closed with respect to a body remainder excluding said front housing portion and wherein the following arrangement is added in the form of an instantaneously actuatable object which is urged by a spring against the lower surface of the front housing portion when the latter is in its closed state, so that when the front housing portion is opened, the instantaneously actuatable object is put into instantaneous visual action.

According to the present invention, when the front housing is opened, a dynamic change can be imparted to the vehicle for children, which can arouse the interest of children. However, such dynamic change is not the only one: besides the opening of the front housing, a visual dynamic change in scene is produced by the instantaneously actuatable object. Such change in scene is full of unexpectedness, for further arousing the interest of any child.

Other objects and features of the invention will become more apparent from the following detailed description given with reference to the accompanying drawings.

BRIEF DESCRIPTION OF THE DRAWINGS

FIG. 1 is a perspective view showing the external appearance of an embodiment of the invention;

FIG. 2 is a perspective view showing a hood-like front housing;

FIG. 3 is a section taken along the axis of a shaft supporting the front housing of FIG. 1 turnable with respect to a body remainder;

FIG. 4 is a plan view of a tongue element serving as an instantaneously actuatable object shown in FIG. 2;

FIG. 5 is a right-hand side view of the tongue element of FIG. 4;

FIG. 9 is a perspective view of guide means shown in FIG. 7;

FIG. 10 is a perspective view, illustrating whistle means operatively connected to engaging means shown in FIG. 7;

FIG. 11 is a perspective view showing the external appearance of another embodiment of the invention;

FIG. 12 is a plan view of a crying face element serving as an instantaneously actuatable object, which is applied to the embodiment shown in FIG. 11;

FIG. 13 is a right-hand side view of the crying face element of FIG. 12;

DESCRIPTION OF THE PREFERRED EMBODIMENTS AND OF THE BEST MODE OF THE INVENTION

Figure 6:
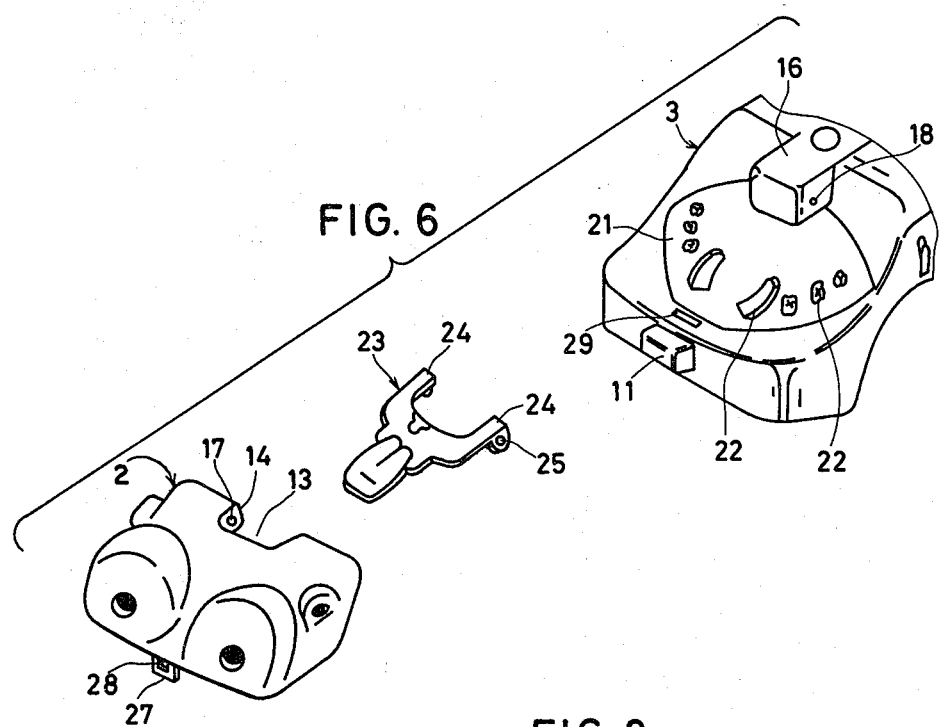
FIG. 6 is an exploded perspective view, showing the front housing, tongue element and body remainder.

Referring to FIGS. 1 and 2, the vehicle for children has a vehicle body 1 which is made of rigid plastic or the like material. The vehicle body 1 is formed with a hood-like front housing 2. A body remainder 3, excluding said front housing 2, is made as a molding separate from the front housing 2. A seat 4 is provided on top of the body remainder 3. The seat 4 is adapted to be opened and closed, and the space below the seat 4 may be arranged to store things. The relatively forward portion of the body remainder 3 is provided with a steering wheel 7 supported on an upwardly projecting wheel shaft 6. Rotatably installed below the body remainder 3 are two ground-engaging front wheels 8 and two ground-engaging rear wheels 9. The front wheels 8 may be arranged so that they can be turned around the axis of the wheel shaft 6 by manipulating the steering wheel 7. The front end of the vehicle body 1 is provided with a push button 11. One side of the vehicle body 1 is provided with an operating lever 12. The push button 11 and operating lever 12 will be operated to open the front housing 2, as shown in FIG. 2.

As described above, the front housing 2 is held so that it can be opened and closed with respect to the body remainder 3. An example of such arrangement is shown in FIG. 3. Referring mainly to FIG. 3 and also to FIGS. 1 and 2, the rear end of the front housing 2 is formed with a notch 13. Ribs 14 are provided at opposite sides of the notch 13. The lower surface of the front housing 2 is formed with second ribs 15 spaced a predetermined distance apart from the first ribs 14. The body remainder 3 is formed with a ridge 16 adapted to be received in the notch 13. The second ribs 15 are each formed with a throughgoing hole, and aligned with these throughgoing holes are throughgoing holes 17 formed in the first ribs 14 and throughgoing holes 18 formed in the lateral walls of the ridge 16.

Shaft members 19 are provided for interconnecting said front housing 2 and said body remainder 3. Each shaft member 19 has, for example, a head at one end and a male thread (not shown in detail) at the other end. The male-threaded portions, as shown in FIG. 3, are screwed into the throughgoing holes 18 in the ridge 16, whereby the shaft members 19 are fixed to the ridge 16. First springs 20 are provided for urging the front housing 2 in a direction to open the latter. The shaft members 19 are inserted in the throughgoing holes in the first and second ribs 14 and 15, with the first coil springs 20 held thereon, whereby the front housing 2 is held turnably with respect to the body remainder 3. The first springs 20 contact the front housing 2 and the body remainder 3 with their legs in the known manner, urging the front housing 2 in a direction to open the latter.

As best shown in FIG. 1, this vehicle for children has a style simulating a hippopotamus. Thus, the front housing 2 is shaped to look like the face of a hippopotamus. The opened state of the front housing 2 shown in FIG. 2 is designed to give an impression of a hippopotamus opening its mouth. More particularly, the inclined surface 21 of the body remainder 3 opposed to the front housing 2 is provided with a representation 22 depicting teeth or fangs. This representation 22 is formed by directly forming the inclined surface 21 with a pattern indicating such shape or by securing a separately made sticker thereto. A tongue element 23 simulating a tongue is disposed in the upper region of the incline surface 21. The arrangement of the tongue element 23 is best shown in FIGS. 4, 5 and 6.

Figure 7:
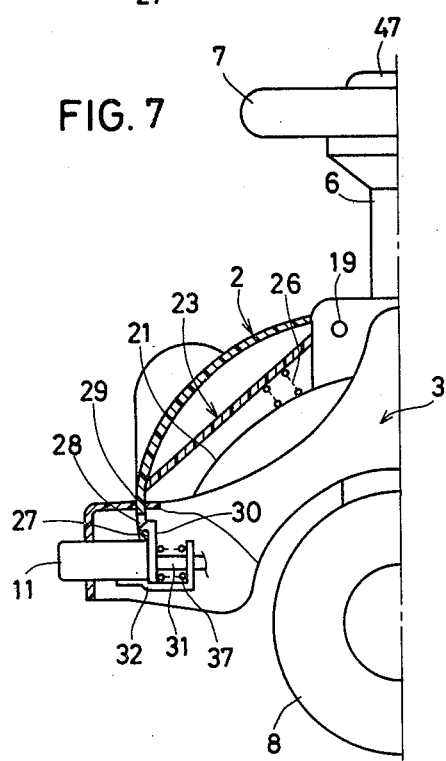
FIG. 7 is a right-hand side view, partly in section, of the front part of the vehicle for children which is in the state shown in FIG. 1.
Figure 8:
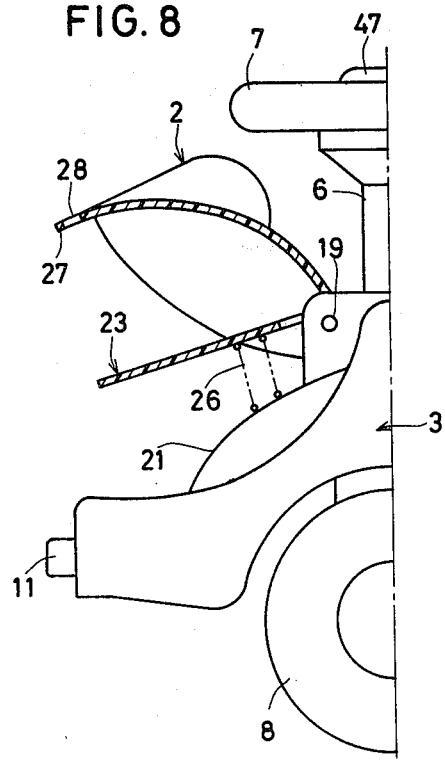
FIG. 8 is a right-hand side view, partly in section, of the front part of the vehicle for children which is in the state shown in FIG. 2.

The tongue element 23 is made, e.g., of plastic, relatively soft rubber or the like material. The coloration of the tongue element 23 is reddish to match with the mental image of a tongue. The base of the tongue element 23 branches off. The branches 24 are each formed with a throughgoing hole 25. The lower surface of the tongue element 23 is provided with a second spring 26 fixed at its end thereto. The tongue element 23, as shown in FIG. 3, receives the shaft members 19 in its throughgoing holes 25, so that together with the front housing 2 it is turnably supported on the shaft members 19. The tongue element 23, as shown in FIG. 7 or 8, is stored in a space defined between the front housing 2 and the inclined surface 21, with its second spring 26 abutting against the inclined surface 21 of the body remainder 3.

The front housing 2, as already described, is urged in its opening direction by the first springs 20. Engaging means is provided for selectively fixing the front housing 2 in its closed state against the resilience of the first springs 20. As shown in FIG. 2, 6, 7 or 8, the front end of the front housing 2 is formed with a downwardly extending projection 27. The projection 27 is formed with a rectangular engaging hole 28. The front end of the body remainder 3 is formed with an elongated throughgoing hole, i.e., slot 29 for receiving the projection 27. An engaging member 30 is disposed in a downwardly facing space in the body remainder 3 so that it may engage one end edge of the engaging hole 28 when the projection 27 is received in the slot 29. The engaging member 30 is fixed to the push button 11 previously described. The engaging member 30 is formed with a hook on its front end, said hook being adapted to engage one end edge of the engaging hole 28. A rod 31 is connected to the push button 11. Thus, with the movement of the push button 11, the engaging member 30 and the rod 31 are integrally moved. The push button 11 and the engaging member 30 are held by guide means 32 shown enlarged in FIG. 9, and are guided thereby during movement. The guide means 32 is provided with a receiving portion 33 of U-shaped cross-section for slidably receiving the push button 11. Further, the guide means 32 is provided with attaching holes 34 for attaching the guide means to the lower surface of the body remainder 3. The rod 31 is received in a guide rod hole 36 formed in an upright portion 35. A coil spring 37 is interposed between the upright portion 35 and the engaging member 30, thereby urging the engaging member 30 to the left in FIG. 7, i.e., in a direction for the hook portion of the engaging member 30 to engage the engaging hole 28. The lower end of the engaging member 30 is positioned to contact a portion 38 lying a step below the receiving portion 33, so that the range of movement of the engaging member 30 is limited to the extent of said portion 38.

The rod 31 extends rearwardly suitably clearing obstacles in the body remainder 3, though not shown in detail. The rear end portion of the rod 31 is shown in FIG. 10. Referring to FIG. 10, a whistling device 40 is attached to a vertical wall 39 disposed at a position which cannot be seen through from outside and which is approximately intermediate between the ends of the body remainder 3. The whistling device 40 comprises a bellows made, e.g., of flexible plastic, and a whistle, the arrangement being such that when the bellows is compressed, the air is discharged therefrom to blow the whistle. The rear end of the rod 31 is connected to the whistling device 40 so that a displacement of the rod 31 in the direction of arrow 41 compresses the bellows.

A displacement of the rod 31, which is operatively associated with the operation of pressing the push button 11, can also be produced by turning the operating lever 12. The operating lever 12 is adapted to be turned integrally with a rotary shaft 42 supported turnably with respect to the body remainder 3. Therefore, turning the operating lever 12 causes the rotary shaft 42 to turn around its own axis. A lever 43 is fixed to the rotary shaft 42. The lever 43 is formed with an elongated hole 44, in which the rod 31 is received. On the side of the lever 43 opposed to the whistling device 40, a flange 45 is fixed to the rod 31. Thus, if the operating lever 12 is manipulated to turn the rotary shaft 42 in the direction of arrow 46, the lever 43 pushes the flange 45, whereby the rod 31 together with the flange 45 is moved in the direction of arrow 41.

Operation concerning the arrangement described above, particularly the front housing 2 and tongue element 23, will now be described.

The closed state of the front housing 2 is shown in FIGS. 1 and 7. In this closed state, the engaging member 30 is engaged with one end edge of the engaging hole 28, maintaining the front housing 2 in the closed state against the resilience of the first springs 20. The tongue element 23 upwardly urged by the second spring 26 is abuttinhg against the lower surface of the front housing 2 and maintained in a potential energy state. In order to shift the front housing 2 from its closed to its opened state, either of the following operations is effected: pressing the push button 11 or turning the operating lever 12. In response to either of these operations, the front housing 2 is substantially instantaneously and automatically opened by the action of the first springs 20. In addition, along with such operation for disengaging the engaging member 30, i.e., the operation of pressing the push button 11 or the operation of turning the operating lever 12, the whistling device 40 shown in FIG. 10 is blown.

Thus, an action is achieved in response to the opening of the front housing 2. That is, in the closed state of the front housing 2, the tongue element 23 is in a downwardly pressed state while compressing the second spring 26. In this state, if the front housing 2 is turned upwardly, this means removal of the member which has held down the tongue element 23. Accordingly, in response thereto, the tongue element 2, under the resilient force of the second spring 26, is instantaneously turned upwardly to the extent allowed by the expansion of the second spring 26. Immediately after the upward turning of the tongue element 23, it will swing until the vibration of the second spring 26 dies away. Such instantaneous upward turning and subsequent swinging of the tongue element 23 causes the viewer to imagine a scene of a hippopotamus opening its mouth and moving its tongue, a fact which is of great interest. Further, the representation 22 depicting teeth or fangs on the inclined surface 21, as shown in FIG. 2 or 6, will make the inside of the mouth of a hippopotamus more realistic. In addition, if the tongue element 23 is made of soft rubber or the like material, it itself will swing, producing a more interesting scene.

When it is desired to close the front housing 2 after it has been opened, the front housing 2 may be turned downwardly irrespective of the presence of the tongue element 23. Thus, the projection 27 is inserted into the slot 29. Subsequently, the engaging member 30 is moved against the resilience of the coil spring 34 as guided by the projection 27 until it faces the hook portion, whereupon it engages the latter.

The vehicle for children shown in FIGS. 1 etc. has other ornamental arrangements added thereto. For example, a klaxon accessory 47 is installed at the middle of the steering wheel 7. The klaxon accessory 47 works on substantially the same principle as the whistling device 40, and comprises a bellows and a whistle, the arrangement being such that when the bellows is manually compressed, the air is discharged therefrom to blow the whistle.

A telephone receiver accessory 48 simulating a wireless telephone receiver is disposed in the vicinity of the steering wheel 7. This telephone receiver accessory 48, which can be detached from the vehicle body 1, is connected to the latter by a cord accessory 49.

FIG. 11 is a perspective view showing the external appearance of another embodiment of the invention. FIG. 12 is a plan view of a crying face element serving as an instantaneously actuatable object, which is applied to the embodiment shown in FIG. 11. FIG. 13 is a right-hand side view of the crying face element of FIG. 12.

The embodiment to be described with reference to FIGS. 11 through 13 has a modified front housing 2 and a modified instantaneously actuatable object. The arrangement of the other portions is the same as in the first embodiment described and shown in FIGS. 1 through 10. Therefore, like parts are given like reference numerals, and a description thereof is omitted.

The front housing 2 in the second embodiment represents a human face expression with the eyes opened and the mouth closed, in caricature, depicting a smiling face as a whole. The opened eyes are expressed by making use of headlight-like portions 50, while the mouth and nose are represented by a sticker 51.

A crying face element 52 shown in FIG. 12 is used as an instantaneously actuatable object corresponding to the tongue element 23 of the preceding embodiment at a position hidden by the front housing 2. The crying face element 52 is made entirely of plastic material. The portions representing the eyes are formed by louvered members 53. Weeping eyes are expressed on the forward surfaces of the louvered members 53 as by securing stickers thereto. A sticker 54 representing a crying mouth is applied to the portion corresponding to the mouth. The combination of this mouth and said eyes expresses a crying face as a whole.

The crying face element 52 is attached to the body remainder 3 in the same manner as the tongue element 23 of the first embodiment. Thus, a pair of brackets 55 formed on the crying face element 52 correspond to the branches 24 and throughgoing holes 56 formed therein correspond to the throughgoing holes 25.

According to this second embodiment, the operation of the push button 11 or operating lever 12 produces a dynamic change such that the front housing 2 is opened to allow the crying face element 52 to instantaneously jump up, thus realizing a sudden change from a smiling to a crying face.

Figure 14:
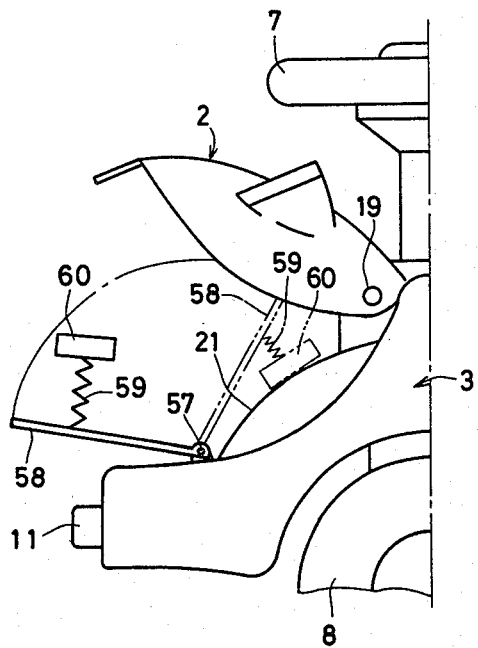
FIG. 14 is a right-hand side view of part of a further embodiment of the invention, showing the front housing in its opened state.

FIG. 14 is a right-hand side view of part of a further embodiment of the invention, showing the front housing in its opened state. In addition, the front housings 2 shown in FIGS. 14 through 19 each correspond in form to the front housing 2 shown in FIG. 11. However, the form of the front housings 2 is not limited thereto. In this connection, it is to be pointed out that they may have, for example, forms to be later described with reference to FIGS. 20 through 24. FIGS. 14 through 19 show modifications related to the jump-up object corresponding to said tongue element 23 and crying face element 52. Therefore, the arrangement of the other parts is the same as in the first embodiment previously described, and a description thereof is omitted.

Referring to FIG. 14, a rotary plate 58 is turnably supported on a shaft member 57 installed at a position different from that of the shaft member 19. One surface of the rotary plate 58 which is put into opposed relation to the inclined surface 21 of the body remainder 3 at one end of the turning movement of the rotary plate, has a jump-up object 60 attached thereto through a coil spring 59. The shape of the jump-up object 60 may be variously changed.

In the embodiment shown in FIG. 14, a coil spring having a relatively strong resilient force is selected for use as the coil spring 59. In the closed state of the front housing 2, the rotary plate 58, coil spring 59 and jump-up object 60 assume a position shown in phantom lines in FIG. 14. Such position in the closed state can be established by manually operating the rotary plate 58, i.e., by closing the front housing 2 while maintaing the rotary plate 58 pushed in toward the inclined surface 21. Thus, when the front housing 2 is opened, the rotary plate 58 is forwardly turned vigorously by the resilient force of the coil spring 59, whereupon the coil spring 59 and jump-up object 60 are drawn out to the front of the body remainder 3. In this state, the coil spring 59 vibrates, swinging the jump-up object 60 until the vibration of the coil spring dies away. This gives an impression as if it were a jack-in-the-box.

As a modification of the embodiment shown in FIG. 14, it may be contemplated omitting the jump-up object 60 and shaping the rotary plate 58 into a tongue form. In that case, if the rotary plate 58 in the form of a tongue is extended long, it is more effective. Such modification will give an impression as if it were a monster.

Figure 15:
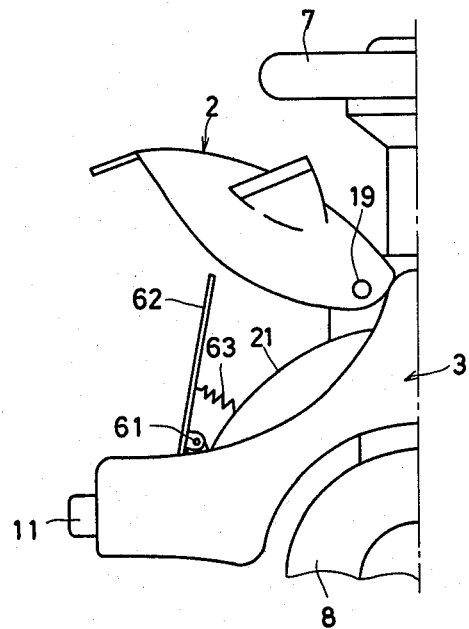
FIG. 15 is a right-hand side view of part of a further embodiment of the invention, showing the front housing in its opened state.

FIG. 15 is a right-hand side view of part of a further embodiment of the invention, showing the front housing in its opened state. Referring to FIG. 15, a display plate 62 is turnably supported on a shaft member 61 installed at a position different from that of the shaft member 19. The display plate 62 has a coil spring 63 attached to its back, and is connected to the inclined surface 21 of the body remainder 3 by said coil spring 63. The display plate 62 is designed so that the forward turning movement thereof terminates at a position shown in FIG. 15. When the front housing 2 is in the closed state, the display plate 62 is maintained in contact with the lower surface of the front housing 2 against the resilience of the coil spring 63. When the front housing 2 is opened, the display plate 62 is forwardly turned by the resilient force of the coil spring 63, assuming a raised position.

The front surface of the display plate 62 has various uses. First, it may be used as a scribbling board. Secondly, it may have a suitable display attached thereto in advance. As for such display, various forms may be contemplated. For example, a design of musical notes may be displayed. Such vehicles for children having a toy xylophone or piano added thereto have already been proposed. In such case, a display of musical notes is particularly interesting. In place of musical notes, it is possible to use other forms of display suited to the type of the vehicle for children. As an example, in the case of a vehicle for children simulating a police patrol car, a caricature of a policeman running after a thief would arouse the interest of children.

Figure 16:
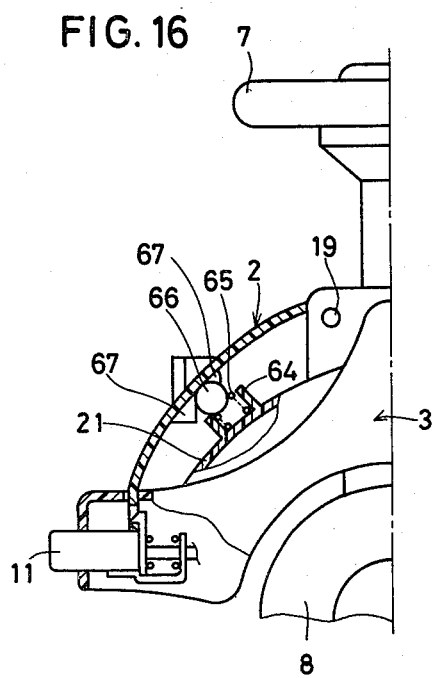
FIG. 16 is a right-hand side view, partly in section, of part of another embodiment of the invention, showing the front housing in its closed state.
Figure 17:
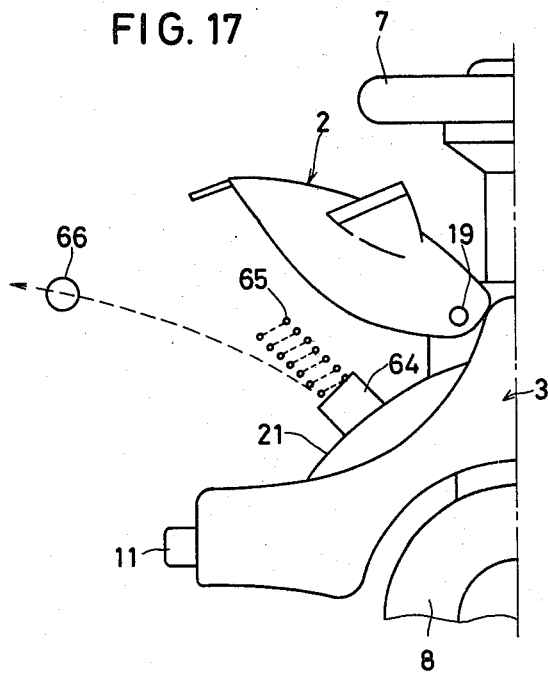
FIG. 17 is a right-hand side view of part of the embodiment of FIG. 16 showing the front housing in its opened state.

FIG. 16 is a right-hand side view, partly in section, of part of another embodiment of the invention, showing the front housing in its closed state. FIG. 17 is a right-hand side view of part of the FIG. 16 embodiment, showing the front housing in its opened state.

Referring to FIGS. 16 and 17, a sleeve-like guide 64 projects from the inclined surface 21 of the body remainder 3. A coil spring 65 is received in the guide 64. A pitchout object 66 is prepared as an independent article separable from the body remainder 3. The pitch-out object 66, serving as an instantaneously actuatable objects, is in the form of a commercially available ping-pong ball or the like. When the front housing 2 is to be closed, as shown in FIG. 16, with the coil spring 64 received in the guide 64, the pitch-out object 66 is placed on said guide and then the front housing 2 is closed while maintaining the placed state of the pitch-out object. In addition, a suitable projection 67 is provided on the lower surface of the front housing 2 for assisting in positioning the relatively unstable pitch-out object 66.

As shown in FIG. 17, when the front housing 2 is opened, the pitch-out object 66 is thrown out by the resilient force of the coil spring 65, with a sufficient force to fly over a predetermined distance.

The operation of such pitch-out object 66 gives an impression suggesting a jack-in-the-box.

The embodiment shown in FIGS. 16 and 17 may be modified as follows. For example, the pitch-out object 66 may be fixed to the front end of the coil spring 65 so that when the front housing 2 is opened, the pitch-out object 66 floats at the front end of the coil spring 65. When the pitch-out object 66 is to be thrown over a given distance, as shown, the coil spring 65 may be designed to have a length such that it will remain inside the guide 64 rather than extend beyond the latter as shown in FIG. 17. Further, the pitch-out object 66 is not limited to a ping-pong ball; it may be of any other desired form.

Figure 18:
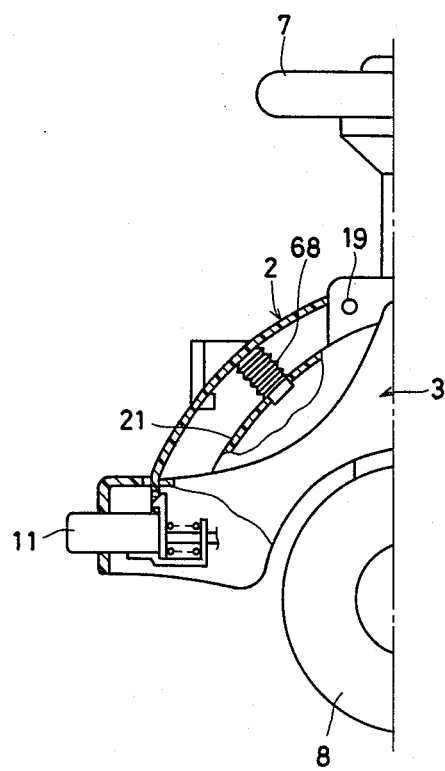
FIG. 18 is a right-hand side view, partly in section, of part of another embodiment of the invention, showing the front housing in its closed state.
Figure 19:
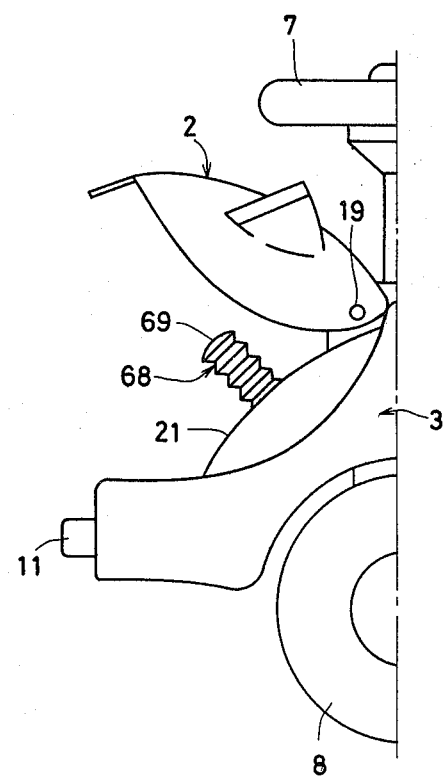
FIG. 19 is a right-hand side view of part of the embodiment of FIG. 18, showing the front housing in its opened state.

FIG. 18 is a right-hand side view, partly in section, of part of another embodiment of the invention, showing the front housing in its closed state. FIG. 19 is a right-hand side view of part of FIG. 18 embodiment, showing the front housing in its opened state.

Referring to FIGS. 18 and 19, a bellows 68 is attached to the inclined surface 21 of the body remainder 21. The bellows 68 is made, e.g., of elastic flexible plastic. The bellows 68 itself constitutes a spring and forms an instantaneously actuatable object.

When the front housing 2 is closed, as shown in FIG. 18, the bellows 68 is compressed and maintained in contact with the lower surface of the front housing 2. When the front housing 2 is opened, as shown in FIG. 19, the bellows 68 extends with a sufficient force to project high above the inclined surface 21.

In this embodiment, it is possible to add interesting arrangements. An example thereof is to provide a display of an eyeball or a nose. According to this arrangement, when the front housing 2 is opened, a dynamic scene of the eyeball or nose jumping up with force comes into view. As another example, a whistle may be attached to the bellows 68. With this arrangement, when the front housing 2 is opened or closed, the air discharged from the bellows 68 blows the whistle. Thus, an acoustic change as well as a visual change is produced.

FIGS. 20 through 24 are perspective views showing the external appearance of other embodiments of the invention. The vehicles for children shown in these figures are intended to exemplify those vehicles whose external shapes give different impressions. However, the vehicles for children shown in FIGS. 20 through 24, and also the embodiments previously described have many common parts. For example, the common parts include the body remainder 3, seat 4, steering wheel 7, front wheels 8, rear wheels 9, push button 11, and operating lever 12.

Each of the vehicles shown in these figures is adapted to have a handle 70 attached thereto. Such handle 70 can be attached in the manner shown in FIG. 20. The handle 70 is attached by being inserted in holes 71 (FIGS. 21 through 24) formed in the rear end of the body remainder 3. Further, the handle 70 can be easily withdrawn from the holes 71. Therefore, it can be installed only when necessary (FIG. 20) and detached when unnecessary (FIGS. 21 through 24). The handle 70 is used when a grown-up pushes the vehicle with a child sitting on the vehicle to amuse the child or when a child pushes the vehicle.

Referring to FIGS. 20 through 24, the features of the vehicles shown therein will now be described.

Figure 20:
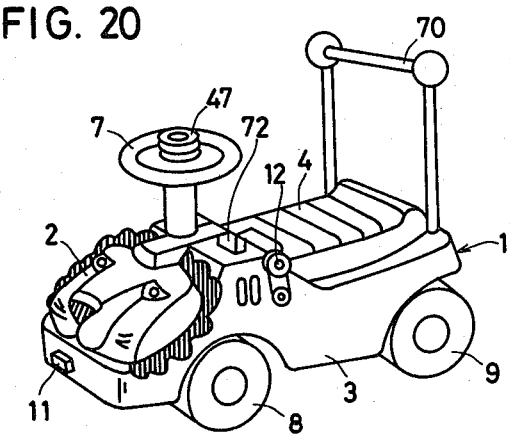
FIGS. 20 through 24 are perspective views showing the external appearance of other embodiments of the invention.

FIG. 20 shows a vehicle for children simulating a lion. Thus, the front housing 2 has the shape of a lion's face. Ear accessories 72 corresponding to lion's ears are attached, for example, removably.

Figure 21:
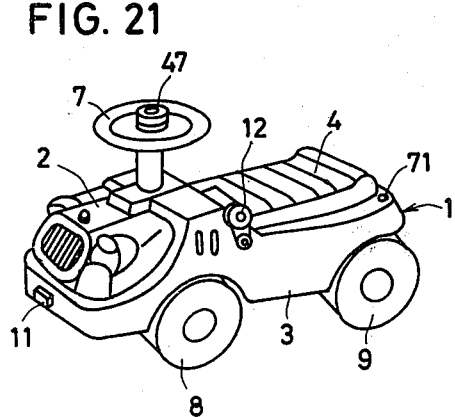

FIG. 21 shows a vehicle for children simulating a classic car. Thus, the front housing 2 is in the form of the bonnet of a classic car.

Figure 22:
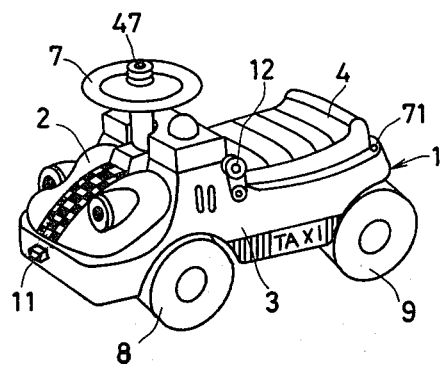

FIG. 22 shows a vehicle for children simulating a taxi. Thus, a representation to make the vehicle look more like a taxi is applied to the front housing 2, etc.

Figure 23:
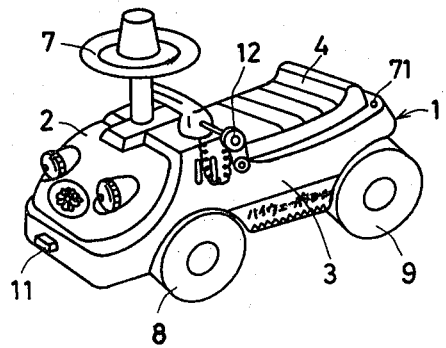

FIG. 23 shows a vehicle for children simulating a police patrol car. Thus, a representation to make the vehicle look more like a police patrol car is applied to the front housing 2.

Figure 24:
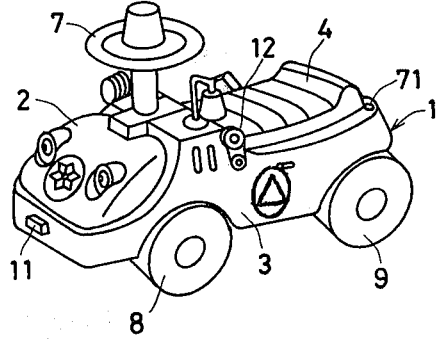

FIG. 24 shows a vehicle for children simulating a fire engine truck. Thus, a representation to make the vehicle look more like a fire engine truck is applied to the front housing, etc.

It will be understood that in the vehicles for children shown in FIGS. 1, 11 and 20 through 24, by having the body remainder 3 in common and changing the front housing 2 in various manners, it is possible to produce a variety of products with ease. As can be understood from the examples shown in these figures, the front housing 2 may be made to represent other different types. For example, it may have the shape of the front of an airplane, a locomotive or a streetcar.

It is also possible to hide various instantaneously actuatable objects under the front housing 2 of the vehicles shown in FIGS. 20 through 24, in the manner described with reference to FIGS. 1 through 19. Such instantaneously actuatable objects may be more realistic. For example, if the front housing has the shape of a lion's face, the instantaneously actuatable object may be such as to represent the interior of its mouth, and in the case of an automobile, it may represent an engine. Alternatively, it is possible to select an unexpectable form having almost nothing to do with the shape of the front housing: for example, a form selected on the basis of the conception of a jack-in-the-box or a monster.

While the invention has so far been described with reference to various embodiments thereof, the following modifications are also possible. For example, while the front housing 2 has been shown as turnably supported on the shaft 19 disposed in the relatively rear upper region of the front housing 2, in the illustrated embodiments, it may be turnably supported on a shaft member disposed in the relatively front lower region of the front housing. Further, an arrangement may be adopted wherein the front housing is turnably supported on a laterally positioned shaft so that it may be laterally opened. As another arrangement, the front housing may be divided into two parts in the manner of a double-leafed hinged door.

Further, as one of the operating means for opening the front housing, the push button 11 projecting from the front end of the vehicle body 1 has been provided. According to such embodiment, when a child sitting on the seat 4 with the legs on either side is driving the vehicle with leg strokes kicking the ground, if the vehicle strikes an obstacle, the push button 11 is pressed, so that the front housing 2 can be opened upon collision. Further, the instantaneously actuatable object can be actuated substantially instantaneously under the front housing 2. If a whistling device 40 as shown in FIG. 10 is employed, the whistle is blown, giving an impression as if the vehicle is complaining of the pain it suffered from the collision. While such manner of use is very interesting, if such feature is not desired, the position where the operating means for opening the front housing 2 is located may be changed as desired.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vehicle for children comprising: a vehicle body having a front housing and a body remainder excluding said front housing, means for opening and closing said front housing with respect to the body remainder, said body remainder having a surface opposed to the front housing with a space left therebetween, said means for opening and closing including a first spring urging said front housing in a direction to open the latter, engaging means for selectively establishing the closed state of said front housing against the resilience of said first spring, said vehicle further comprising an instantaneously actuatable object disposed in a space defined between said body remainder and said front housing, a second spring urging said instantaneously actuatable object against the lower surface of said front housing when the latter is in its closed state, so as to put said instantaneously actuatable object into instantaneous visual action when the front housing is opened, and a first shaft turnable with respect to the body remainder for supporting said instantaneously actuatable object.

2. The vehicle for children as set forth in claim 1, wherein the second spring is disposed between the lower surface of the instantaneously actuatable object and the upper surface of the body remainder.

3. The vehicle for children as set forth in claim 1 or 2, wherein the front housing together with the instantaneously actuatable object is turnably supported on said first shaft.

4. The vehicle for children as set forth in claim 1 or 2, wherein the front housing is turnably supported on a second shaft different from the first shaft.

5. The vehicle for children as set forth in claim 1, wherein the instantaneously actuatable object is separable from the body remainder and adapted to be pitched out when the front housing is opened.

6. The vehicle for children as set forth in claim 1, wherein the second spring is in the form of a bellows made of elastic material, said bellows itself forming instantaneously actuatable object.

* * * * *